Patented May 10, 1949

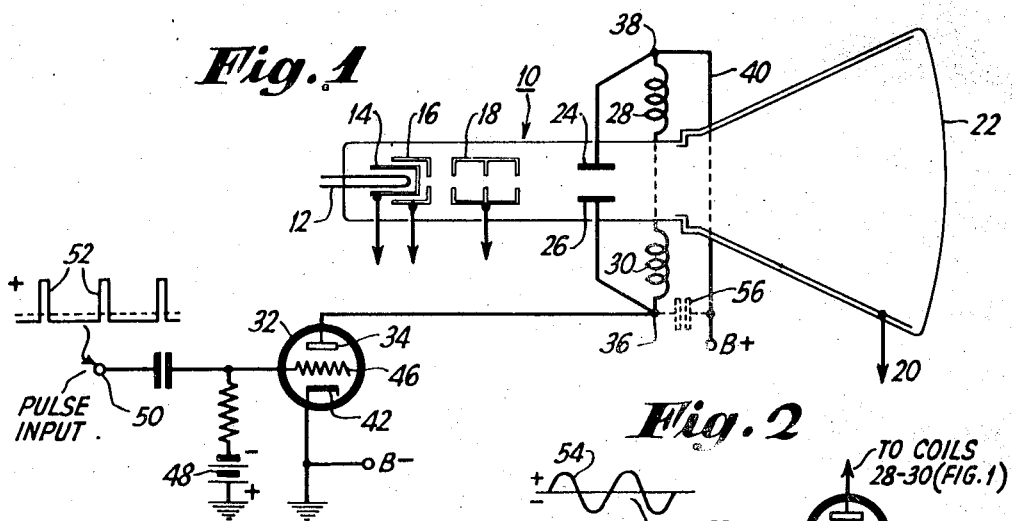
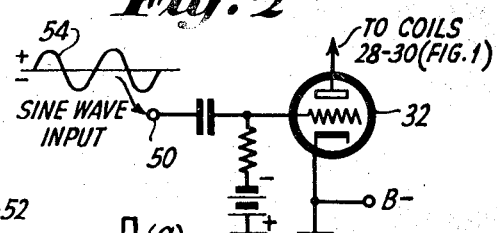

2,469,895

UNITED STATES PATENT OFFICE 2,469,895

CATHODE-RAY BEAM DEFLECTION CIRCUIT

Gordon F. Rogers, New Hyde Park, N. Y., assignor to Radio Corporation of America, a corporation of Delaware Application February 12, 1947, Serial No. 728,001

4 Claims. (Cl. 315—24)

The present invention relates to cathode ray beam deflection circuits, and more particularly relates to means for so deflecting the electron beam of a cathode ray tube as to produce on the screen of the tube a trace of either circular or spiral configuration.

The most frequently used time base sweep employed in cathode ray tube applications consists of a linear trace which is obtained by causing a sawtooth wave of current to flow through a pair of electro-magnetic deflection coils, in the case of magnetically-deflected cathode ray tubes, or by applying to a set of deflection plates, in the case of electrostatically-deflected tubes, a voltage variation of sawtooth waveform. The length of such a linear trace, however, is obviously limited to the diameter of the tube screen.

It is occasionally desirable to increase the length of such a time base sweep in order to permit greater accuracy in estimating the position of an indication thereon. This is particularly true in systems where a measurement of elapsed time is desired. For such purposes, it has been customary to deflect the tube scanning beam so that the pattern traced on the screen is of circular, or spiral, configuration. The latter, in particular, provides a time base on which very precise readings may be taken.

One reason why the advantages of a spiral sweep have not resulted in its more general use is that additional circuit components are necessary to produce the desired deflection voltages or currents. In the case of electrostatically deflected tubes, for example, the voltages applied to the two sets of deflection plates must be of similar sine wave shape and must, in addition, have a phase difference of 90°. These sine wave voltages are usually obtained from push-pull amplifiers whose gain is controlled by the application of a sawtooth voltage the frequency of which is a submultiple of the sine wave voltages. In this manner the amplitude of each of the sine wave voltages is increased (or decreased) continuously during a number of sine wave cycles, so that the trace-forming spot on the screen of the cathode ray tube in effect rotates on a circle of ever-increasing (or decreasing) diameter. A circuit of this nature must be very stable in operation, however, since if the linear increase in sweep voltage amplitude does not start at exactly the same point in the circular sweep, then each spiral will not coincide with the previous one. Furthermore, if the frequency of the sawtooth voltage is not an exact sub-multiple of the frequency of the sine waves, then the spiral will revolve so as to produce a pin-wheel pattern. Still further, relatively high input voltages are necessary in order to obtain sufficient deflection amplitude.

In accordance with the present invention, there is provided a simplified circuit for producing either a circular or a spiral trace on the screen of a cathode ray tube. In a preferred embodiment, a cathode ray tube is utilized having one set of electro-magnetic deflection coils for deflecting the cathode ray scanning beam in one direction, and also one set of electrostatic deflection plates for deflecting the beam in another direction perpendicular to the direction of deflection provided by the coils. The two deflection plates are then connected to the two coils so that the capacitance between the plates, together with the inductance of the coils, forms a parallel tuned, or resonant, circuit. When this resonant circuit is energized by some method such as shock-excitation, oscillations will be produced, and the amplitude of these oscillations will decline in value exponentially. If the shock-excitation consists of a series of relatively narrow pulses, each pulse of the series will serve to initiate a new oscillatory cycle, while the "Q" of the deflection coils will determine the rate of exponential decay of the oscillations. The oscillation frequency, of course, depends upon the resonant frequency of the coil-plate circuit. If the capacity provided by the two deflection plates of the cathod ray tube is insufficient to cause the circuit to be resonant as a desired frequency, then an external capacitor may be added in parallel with the deflection plates.

The voltage across the pair of deflection coils reaches a maximum value at the point in each oscillatory cycle when the current through the deflection coils is zero. Since the deflection plates are respectively connected directly to the ends of the set of deflection coils, the deflection voltage on the plates is at a maximum when the deflection field produced by the current flow through the coils is at a minimum. Conversely, the voltage on the plates is substantially zero when the current flow through the coils is at peak value. These conditions, together with the above-mentioned exponential decay in the amplitude of the oscillations between successive time periods when the circuit is shock-excited, are such that a spiral sweep or scan will be produced on the luminescent screen or target area of the cathode ray tube.

An arrangement of the type described above may also be employed to generate a circular instead of a spiral trace. This may be brought about by supplying current of sine wave shape to the coil-plate circuit instead of relatively sharp pulses, the latter acting to control the production of a spiral sweep in the manner set forth above.

One object of the present invention, therefore, is to provide an improved circuit for so deflecting the electron scanning beam of a cathode ray tube as to produce on the screen of the tube a trace of either circular or spiral configuration.

Another object of the invention is to provide a cathode ray tube having one set of electromagnetic deflection coils and one set of electrostatic deflecting plates, and to so connect these elements that the inductance of the coils, together with the capacity of the plates, forms a resonant circuit which is adapted to be selectively energized.

Other objects and advantages will be apparent from the following description of a preferred form of the invention and from the drawings, in which:

Fig. 1 is a schematic representation of a preferred form of the present invention;

Fig. 2 is a modification of the representation of Fig. 1; and

Fig. 3 is a set of waveforms illustrating the operation of the circuits of Figs. 1 and 2.

Referring first to Fig. 1, there is illustrated a cathode ray image-reproducing tube, generally indicated by the reference numeral 10. Tube 10 includes an electron gun structure which may be of a conventional type, and which includes a heater element 12, a cathode 14, a grid 16, and a first anode 18. Tube 10 is also provided with a second anode 20, so that the electrons which emanate from the cathode 14 may be accelerated by the first anode 18 and the second anode 20 toward a screen or target area 22 at the opposite end of tube 10 from the electron gun. It is, of course, assumed that the various elements 12, 14, 18 and 20 are provided with suitable operating potentials from a source or sources which have not been shown in order to simplify the drawing.

Tube 10 is also provided with means for deflecting the electron beam which is produced and accelerated in the manner above described. This means comprises in part a pair of electrostatic deflecting plates 24 and 26, respectively. Plates 24 and 26 are adapted, upon the application of suitable potentials thereto, to deflect the electron scanning beam of tube 10 so that the scanning beam will traverse the screen 22 in substantially a single plane.

Tube 10 is also provided with a pair of electro-magnetic deflecting coils 28 and 30, respectively. Coils 28 and 30 are adapted, when suitably energized by a flow of current therethrough, to deflect the electron scanning beam of tube 10 across the screen 22 in a direction which is perpendicular to the direction of deflection produced by the application of suitable potentials to the deflecting plates 24 and 26.

Deflecting plate 24 is connected as illustrated to one end of the deflecting coil 28. Similarly, plate 26 is connected to one end of the deflecting coil 30. The remaining ends of the coils 28 and 30 are joined together in the usual manner, as shown in the drawing. It will thus be seen that the deflecting plates 24 and 26 are so connected to the deflecting coils 28 and 30 that the capacitance between the plates 24, 26, together with the inductance of the coils 28, 30, forms a tuned, or resonant, circuit.

This tuned, or resonant, circuit formed by the elements 24, 26, 28 and 30 is connected in the anode cathode circuit of an electron discharge device 32, the anode 34 of tube 32 being connected to the electrical junction point 36 of the plate 26 and coil 30. The electrical junction point 38 of plate 24 and coil 28 is connected by means of a lead 40 to the positive terminal of a suitable source of operating potential (not shown) for tube 32. The cathode 42 of tube 32 is connected to ground and also to the negative terminal of the above-mentioned source of operating potential.

It will thus be seen that the resonant circuit formed by the deflecting plates 24, 26 and the deflecting coils 28, 30 is in effect a "tank" circuit connected to the anode 34 of tube 32. This tank circuit may be set into oscillation by supplying surges of electrons thereto from tube 32, these surges of electrons providing surges of energy which can oscillate between the electrostatic field produced by the plates 24, 26 and the electromagnetic field produced by the coils 28, 30.

In Fig. 1, oscillations are set up in the deflecting coil-plate circuit of the cathode ray tube 10 by causing the electron discharge device 32 to act in effect as a switch which acts to suddenly change the amount of energy in the resonant circuit. This is accomplished by so biasing the grid 46 of tube 32 by means such as the battery 48 that tube 32 is normally cut off in the absence of a positive control variation applied to the input terminal 50. When the grid 46 is made less negative, however, such as by the application of one of a series of pulses 52 thereto, tube 32 conducts and a pulse of energy is supplied to the deflecting coil-plate circuit of the cathode ray tube 10 which is effective to initiate oscillations in this circuit. If the repetition frequency of the pulses 52 is relatively low compared to the resonant frequency of the deflecting coil-plate circuit, the oscillatory action of the circuit will be as shown in curves $a$, $b$ and $c$ of Fig. 3.

Let it first be assumed that tube 32 is cut off and that there is no energy in the deflecting coil-plate circuit of tube 10. The current through the coils 28 and 30 is, therefore, zero. When one of the positive pulses 52 is applied to the grid 46 of tube 32, current flows in tube 32 and also through the coils 28 and 30 for a length of time equal to the duration of the pulse 52. This current sets up a magnetic field around the coils 28 and 30. As the current increases, the magnetic field is made stronger and the energy stored in the magnetic field increases. When the current through coils 28 and 30 is stopped at the end of the pulse 52, the collapsing magnetic field induces a voltage across the coils 28 and 30. This voltage appears on plates 24 and 26, so that the energy in the magnetic field surrounding coils 28 and 30 is now transferred to the deflecting plates 24 and 26.

The charge on these plates increases until the magnetic field surrounding coils 28 and 30 has collapsed to zero. At this time, the energy on plates 24 and 26 begins to discharge through the coils 28 and 30, and the magnetic field around these coils begins to increase in the opposite direction. Thus, the surge of energy which was introduced into the deflecting coil-plate circuit from tube 32 oscillates between the plates 24, 26 and the coils 28, 30. This oscillation continues until all of the energy introduced into the circuit has been dissipated in the coil-plate circuit losses. The oscillatory action of the deflecting coil-plate circuit of the cathode ray tube 10 is illustrated by the curves $b$ and $c$ in Fig. 3. In this latter figure, the pulses 52 applied to the grid 46 of tube 32 are illustrated in curve $a$. Pulses similar to these pulses 52 constitute the output of tube 32 which acts to shock-excite the coil-plate circuit of tube 10. This shock-excitation produces, in the manner above described, a voltage on the plates 24, 26 such as represented by curve $b$. The current through coils 28, 30, on the other hand, is represented as curve $c$ in Fig. 3. Curves $b$ and $c$ are 90° out of phase, since the voltage on plates 24, 26 is at a maximum when the current through coils 28, 30 is zero, and, conversely, the voltage on plates 24, 26 is substantially zero when a maximum current is flowing through the coils.

The amplitude of the oscillations in curves b and c declines exponentially as shown due to the losses of energy in the deflection coils and plates. These losses, or, in other words, the "Q" of the circuit, determine the rate at which the energy will be dissipated. As previously stated, the fact that the oscillatory voltage on plates 24, 26 is 90° out-of-phase with the oscillatory current through coils 28 and 30 would normally produce a circular trace on the screen 22 of tube 10, if the amplitude of the oscillations remained constant between the time periods during which successive trigger pulses from the tube 32 are applied to the deflecting coil-plate circuit of tube 10. However, due to the fact that these oscillations decline exponentially in value between successive pulses from tube 32, the trace produced on the screen 22 is of spiral configuration. The losses of the deflecting coil-plate circuit, of course, determine the distance between each convolution of the spiral trace.

If the output impedance of tube 32 is relatively high, the field around the coils 28 and 30 will not be set up immediately, and a partial outgoing spiral may be obtained which will conflict with the incoming spiral produced by the currents and voltage shown in curves b and c. Since it is usually desirable to eliminate the portion of the sweep produced by this outgoing spiral, the cathode ray beam produced by the electron gun of tube 10 may be blanked during the time interval of the outgoing spiral by some such means as by the application of a negative blanking potential to the grid 16.

In the event that it is desired to produce a trace of circular configuration on screen 22 instead of the spiral scan produced by the circuit of Fig. 1 in the manner above described, an arrangement such as shown in Fig. 2 may be employed. In Fig. 2, the electron discharge device 32 is biased to act as a substantially linear or class A amplifier, and a voltage variation 54 of substantially sine wave configuration is applied to the input terminal 50. The output of tube 32, therefore, is also a sine wave. To increase the output of the tube the resonant frequency of the coil-plate circuit may be made equal to the sine wave input 54 frequency, or vice versa. In any case the current flowing through the deflecting coils 28, 30 will be 90° out of phase with the deflection plate voltage of curve d, as shown in curve e. This condition, as previously stated, will produce a circular trace on the screen 22. It is recognized, however, that for a given coil inductance, coil position, and plate capacity, and a given set of potentials supplied to cathode ray tube 10, there is only one frequency at which the relative amplitudes of the voltage across the plates and the current through the coils will be correct to produce a circular trace, provided that the coil and plates are so designed as to give equal deflections to the beam in each direction. If they are not so designed the trace becomes elliptical.

In the event that the capacitance between the plates 24 and 26 is insufficient to permit the deflecting coil-plate circuit to be resonant at a desired frequency, it is possible to add an external capacitor 56 (shown in dotted lines in Fig. 1) in parallel with the capacitance provided by the plates 24, 26. The value of this external capacitor 56 may be so chosen as to permit any desired frequency of resonance within the limits determined by the remaining components of the circuit.

It may be necessary or desirable to adjust the relative amplitude of deflection of the electron scanning beam of tube 10 produced by the electrostatic and electromagnetic fields. One convenient way of accomplishing this is to adjust the position of the coils 28 and 30, such as by sliding these coils along the neck of the cathode ray tube 10.

I claim:

1. In combination, a cathode ray tube having contained therein a pair of electrostatic members adapted to deflect a cathode ray beam in one direction, a pair of electromagnetic coils associated with said tube and adapted to deflect the cathode ray beam in a perpendicular direction, connections between said members and coils to provide a resonant circuit of which the capacitive element is provided by the electrostatic beam deflecting members and the inductive element is provided by the electromagnetic beam deflecting coils, and a source of control pulses connected to develop damped oscillations within said resonant circuit, the rate of damping thereof being so related to the pulse frequency that the oscillations decrease from maximum to substantially zero between two consecutive pulses, thereby providing a spiral trace for said beam covering a circular area.

2. A deflection circuit for a cathode ray beam comprising, a coil for deflecting said beam in one direction, a pair of plates for deflecting said beam in a substantially perpendicular direction, said plates being connected across said coil and forming a resonant circuit the constants of which are such as to produce damped oscillations, and a source of pulses connected to said resonant circuit to energize it periodically, the periods between successive pulses being substantially equal to the decay time of said resonant circuit, whereby said beam develops a series of spiral traces.

3. In a system in which the electron scanning beam of a cathode ray tube is deflected, the combination of a pair of electrostatic deflecting plates within said cathode ray tube, a pair of electromagnetic deflecting coils exterior of said tube, means for so connecting said pair of plates and said pair of coils that the electrical capacity between said plates together with the electrical inductance of said coils forms a damped resonant circuit, and means for periodically applying pulses of energy to shock-excite said circuit, the frequency of said pulses being a small fraction of the free oscillation frequency of said damped resonant circuit.

4. A system according to claim 3, further comprising a capacitor, and means for connecting said capacitor into said resonant circuit in parallel with said pair of electrostatic deflecting plates.

GORDON F. ROGERS.

REFERENCES CITED

The following references are of record in the file of this patent:

UNITED STATES PATENTS

| Number | Name | Date |
| --- | --- | --- |
| 2,139,432 | Andrieu | Dec. 6, 1938 |
| 2,228,266 | Gray | Jan. 14, 1941 |
| 2,244,003 | Eaglesfield | June 3, 1941 |